United States Patent
Dogru et al.

(10) Patent No.: US 8,252,072 B2
(45) Date of Patent: Aug. 28, 2012

(54) GASIFICATION

(75) Inventors: Murat Dogru, Newcastle Upon Tyne (GB); Galip Akay, Sidmouth (GB)

(73) Assignee: ITI Energy Limited, Rotherham (GB)

(*) Notice: Subject to any disclaimer, the term of this patent is extended or adjusted under 35 U.S.C. 154(b) by 1001 days.

(21) Appl. No.: 11/417,229

(22) Filed: May 2, 2006

(65) Prior Publication Data

US 2006/0265954 A1 Nov. 30, 2006

(30) Foreign Application Priority Data

Nov. 4, 2003 (GB) .................................. 0325668.2
Nov. 3, 2004 (WO) ................ PCT/GB2004/004651

(51) Int. Cl.
*B01J 7/00* (2006.01)
*C10J 3/68* (2006.01)
*C10J 3/00* (2006.01)
*C01B 3/36* (2006.01)
*C01B 6/24* (2006.01)

(52) U.S. Cl. ................. 48/61; 48/77; 48/197 R; 48/210; 423/644

(58) Field of Classification Search ................ 48/61, 77, 48/197 R, 210; 423/644
See application file for complete search history.

(56) References Cited

U.S. PATENT DOCUMENTS

| 2,281,562 | A | | 5/1942 | Ditto et al. |
| 4,483,692 | A | * | 11/1984 | Patel ................................ 48/210 |
| 4,865,625 | A | * | 9/1989 | Mudge et al. ............... 48/197 R |
| 5,071,747 | A | | 12/1991 | Hough et al. |

(Continued)

FOREIGN PATENT DOCUMENTS

| DE | 3523765 A1 | 1/1987 |
| DE | 199 16 931 A1 | 10/2000 |
| EP | 1 183 328 | 3/2002 |
| GB | 2244011 A * | 11/1991 |
| WO | WO 9737745 A1 * | 10/1997 |
| WO | WO 00/34454 | 6/2000 |

(Continued)

OTHER PUBLICATIONS

International Search Report for PCT/GB2004/004651.

(Continued)

*Primary Examiner* — Matthew Merkling
(74) *Attorney, Agent, or Firm* — IPLM Group, P.A.

(57) ABSTRACT

A downdraft-updraft gasifier (1) and method for the gasification of biomass and waste to produce combustible effluent, the gasifier comprising: a fuel valve (22) for loading solid fuel (11) into a first oxidation zone (8); a first throat (2) defining the lower edge of the first oxidation zone (8); a second throat (4) defining the lower edge of a second oxidation zone (14); a reduction zone (5) linking the first oxidation zone (8) to the second oxidation zone (14) and a vortex discharge pipe (18) for the combustible effluent. The method includes steps of: partially oxidising a biomass fuel in the first oxidation zone (8) to produce char; reducing the char in the reduction zone (5) to form ash; further oxidising any char residue in the ash in the second oxidation zone (14); and extracting the combustible effluent produced in the above steps, by the discharge pipe (18).

21 Claims, 2 Drawing Sheets

Gasifier (1)

U.S. PATENT DOCUMENTS

| | | | |
|---|---|---|---|
| 6,112,677 | A | 9/2000 | Kuntschar et al. |
| 6,345,907 | B1 | 2/2002 | Akay et al. |
| 2002/0069798 | A1* | 6/2002 | Aguadas Ellis ............... 110/229 |
| 2002/0095866 | A1* | 7/2002 | Hassett .................... 48/199 FM |
| 2002/0128338 | A1* | 9/2002 | Hird et al. ....................... 521/64 |

FOREIGN PATENT DOCUMENTS

| | | |
|---|---|---|
| WO | WO 00/34454 A2 | 6/2000 |
| WO | WO 01/51591 A1 | 7/2001 |
| WO | WO 2004/004880 A2 | 1/2004 |
| WO | WO 2004/005355 | 1/2004 |

OTHER PUBLICATIONS

Dogru et al., "Gasification of Leather Residues—Part I. Experimental Study via a Pilot Scale Air Blown Downdraft Gasifier", Energy Sources, 26:35-44, 2004 Taylor & Francis, Inc.

Dogru et al., "Gasification of hazelnut shells in a downdraft gasifier", Energy 27 (2002), 415-427, Pergamon.

Dogru, M. et al., "Gasification of Sewage Sludge using a Throated Downdraft Gasifier and Uncertainty Analysis" Fuel Processing Technology, 75 (2002), No. 1, 55-82.

* cited by examiner

Figure 1. Gasifier (1)

Figure 2. Gasification system with a gasifier in Fig 1

GASIFICATION

CROSS-REFERENCE TO RELATED APPLICATIONS

This application is a §371 national stage entry from International Patent Application Ser. No. PCT/GB2004/004651, filed Nov. 3, 2004, and published on May 26, 2005 as International Publication No. WO 2005/047435 A2, which in turn claims priority from Great Britain Patent Application Ser. No. 0325668.2 filed Nov. 4, 2003; both of which are incorporated herein by reference.

The present invention relates to a gasifier, a method of operating the gasifier to produce a combustible effluent, a novel gasification system and method incorporating the gasifier, and a novel filter and method for gas filtration using the filter, in particular to produce a tar and moisture free producer gas, and a novel polymer for use in the filter.

Gasifiers are used for the gasification of biomass, fossil fuels and wastes either singly or mixed together, to produce a variety of combustible gases which may be used to generate energy, for example, using internal combustion gas engines, gas turbines, dual-fuel diesel engines and fuel cells.

The interest in the use of gasifiers for treating waste products is increasing due to the rising cost of waste disposal by conventional means, such as by incineration or land filling, driven by the environmental concerns associated with these methods.

Conventional gasifiers typically operate in batch mode wherein slag and clinker formation, as well as bridge formation, create intermittent gas and fuel flow, which in turn is associated with a high tar content in the product gas. Furthermore, clinker formed during the gasification process due to relatively high local temperatures in the oxidation zone cannot be effectively discharged. Gasification of high ash fuels can lead to the discharge from the gasifier of residues with a high carbon content, which can then be difficult to dispose of. As a result of these difficulties, conventional gasifiers are operated until complete gasification of the fuel has taken place and then shut down in order to manually remove the slag and clinker formed in the high temperature regions of the gasifier, together with the high carbon ash.

A further problem arises from the batch operation of gasifiers in that undesirable operating conditions occur during the start-up phase, and if the gasifier operates at low temperatures (<850° C.) during normal use, the tar content of the product gas can rise. Tar in the product gas will deposit in the inner parts of the combustion device used to combust the product gas, blocking the device and requiring cleaning. The current power and heat production devices that are usually attached to gasifiers are not suitable for utilisation of a tar and moisture laden product gas.

The present inventors have discovered that a gasifier having two oxidation zones, wherein in a first zone the gas flow is in a downward direction (in the same direction as the fuel flow), and in a second zone beneath the first zone the gas flow is upwards (in the opposite direction to the fuel flow) addresses many of the difficulties in the known gasifiers. Such a device may be called a 'down-updraft gasifier' to reflect the combination of the down and up flow of the gas.

Accordingly, a first aspect of the present invention provides a gasifier for the gasification of solid fuel to produce combustible effluent, comprising a fuel valve for loading solid fuel into a first oxidation zone, a first throat defining the lower edge of the first oxidation zone, a second throat defining the lower edge of a second oxidation zone, air intakes for both oxidation zones, a reduction zone linking the first oxidation zone to the second oxidation zone and two oppositely located (at the reduction zone) vortex discharge pipes for combustible effluent wherein in the first oxidation zone the gas flow is in the same direction as fuel flow and in the second oxidation zone the gas flow is in the opposite direction to the fuel flow.

In a particular advantage the gasifier is suitable for continuous operation and the method is a continuous operation method, capable of operation for extended periods without the need to shut down to remove slag and klinker. This is due to the high extent of gasification that takes place due in part to the uniformity of gasification, also the ability to remove ash and slag at the base of the gasifier during operation. A further advantage is the minimised hours of operation in start up mode, which tends to increase tar content in product gas.

In the gasifier of the invention the first oxidation zone preferably operates at a temperature of at least 1000° C., whilst the reduction zone operates at a temperature of between 600 and 900° C., more preferably at about 850° C. and the second oxidation zone operates at a temperature of between 700 and 800° C., more preferably at about 750° C. This ensures uniformity of gasification.

It is preferred that the gasifier of the invention further comprises a pyrolysis zone above the first oxidation zone, and a fuel storage zone above the pyrolysis zone. In the use of such a gasifier in a preferred method of the second aspect of the invention, the fuel is dried in the fuel storage zone, and pyrolysed in the pyrolysis zone to yield charcoal which. is then partially oxidised, reduced and further oxidised. The fuel storage and/or drying zone preferably operate at a temperature of between 80 and 120° C., and more preferably at about 100° C. The pyrolysis zone preferably operates at a temperature of between 500 and 700° C., more preferably at about 600° C. The heat to maintain these temperatures is derived from the first oxidation zone.

Preferably the fuel storage zone comprises a hopper having a loading valve and leading to a grate above the first oxidation zone.

The gasifier of the first aspect of the invention may have a perforated part in a jacket-wall filled with microporous catalysis defining the reduction zone located at about the same level in the gasifier body as the discharge pipe. This perforated jacket allows the effluent gas produced in the gasification process to be cleaned and removed efficiently, reducing its path through the second oxidation zone.

The gasifier of the first aspect of the invention preferably further comprises means attached to the discharge pipe for maintaining the gasifier below atmospheric pressure, so that air is sucked into the gasifier through appropriate air inlets. Operating the gasifier at below atmospheric pressure provides a fail-safe mechanism, such that in the event of the means for maintaining the reduced pressure fail, the combustion processes in the gasifier will come to a halt due to a lack of oxygen, preventing a dangerous build up of product gases.

Air inlets into the gasifier are maintained with the negative suction via main air inlet pipes. The continuously sucked air is withdrawn into the ring ducts which are located at the outer circle of the oxidation zones. The ring ducts provide air to be preheated before its injection into the reaction zones through air inlet jets mounted in the inner surface of the inclined throats. Therefore, pre-heated air also has a cooling effect to gasifier's metal surfaces at the throat levels.

In the gasifier of the present invention, the amount of secondary oxidation in the second oxidation zone is controlled by the amount of air admitted by the secondary air intake valve.

Such a gasifier may be used to gasify solid fuel incorporating biomass, fossil fuel, waste or combinations thereof to produce a combustible effluent. 'Solid fuel' can contain entrained liquid (such as moisture, oil, oil sludge) within the intra- or inter-particle pores of the solid fifel particles.

Accordingly a second aspect of the present invention provides a method for the gasification of solid fuel to produce a combustible effluent using a gasifier of the first aspect of the invention, comprising the steps of partially oxidising a solid fuel in the first oxidation zone to produce char, reducing the char in the reduction zone to form ash, further oxidising any char residue in the ash in the second oxidation zone and extracting the combustible effluent produced in the above steps by the discharge pipe wherein in the first oxidation zone the gas flow is in the same direction as fuel flow and in the second oxidation zone the gas flow is in the opposite direction to the fuel flow.

Preferably the combustible effluent at a temperature of around 850° C. produced from the both zones passes through a perforated cone ring which is filled with microporous catalysis to crack the residue tars just before leaving the gasifier.

Preferably solid fuel for the gasifier and method according to the invention incorporates biomass, such as liquid waste, waste oil or petroleum sludge, or fossil fuels or waste or combinations thereof as hereinbefore defined which is absorbed within the intra-particle and inner-particle pores of a suitable combustible carrier. Preferably the combustible carrier has high internal porosity and is more preferably in fibrous form to provide extensive inter-particle porosity. Preferably the liquid waste is mixed with the carrier and briquetted in order to densify the composite fuel.

Biomass which may be gasified by the gasifier and method for gasification of the invention may include any of the conventional extremely varied sources, and include, for example, wood and lignocelluloses, sawdust, coal, nut shells, sewage sludge, leather waste, tyre and plastic waste, municipal refuse or household residual materials, olive pips, rape-seed meal, clinical waste, chicken and cattle litter and manure, slaughterhouse waste, sour chocolate waste, tallow, paper waste, food waste, sugar cane bagasse, waste oil, petroleum sludge; coal fines, bone waste, agricultural residues and blend of biomass with fossil waste such as petroleum sludge mixed with bone waste, sewage sludge, sawdust or rape-seed meal.

A suitable carrier may be selected from saw dust, crushed bone waste from slaughter house, bread/food waste, municipal waste, dried sewage sludge, chopped straw, rape seed meal and sugar cane bagasse.

It is preferred that uniform size briquettes or pellets of fuel (such as biomass or waste carbonaceous materials) are used so as to achieve a uniform air distribution during gasification. It is also preferred that the maximum diameter of the briquettes of fuel is not larger than one eighth of the narrowest part of the gasifier, so as to prevent bridge formation.

In the method for gasification the amount of secondary oxidation required will depend on the remaining char content in ash of the fuels. High ash fuels, such as sewage sludge, leather waste, petroleum residue sludge, house-hold waste (RDF), bone meal, chicken and cattle manure, usually result in low carbon conversion in conventional gasifiers due to the isolation of some carbon by ash in the main oxidation zone.

In a further aspect of the invention there is provided a gasification system comprising in series: the gasifier of the invention, a water scrubber, a polymer filter unit, a fan, a further polymer filter unit and means to exit product gas for energy generation, such as an effluent stack leading to a location for clean ignition.

Preferably the system comprises a filter bypass for use during start up. Preferably the filters comprise double filter units, each working in tandem, such that only one half of each double filter unit is operated in filter mode at any one time, the other operated in regeneration mode.

In a further aspect of the invention there is provide a method for operating a gasification system as hereinbefore defined comprising gasifying a solid fuel as hereinbefore defined, passing the product gases through a scrubber to clean particulates and water soluble toxins as well as acids, a filter to absorb tar and moisture, a fan to accelerate gases, a second filter to absorb additional tar and moisture, to produce a gas for clean ignition. pH of the water scrubber is low in order to remove the acids from the gas.

Preferably gas from the water scrubber bypasses the first filter during start up. Preferably gas is filtered in one half of a double filter unit at any one time, the other half being regenerated, more preferably with hot exhaust gases. In a particular advantage gas exiting the fan is at high pressure which is conducive to further condensation of tar and moisture in the second double polymer filter unit.

In a further advantage of the invention the system of the invention and method for operation thereof produces gas which is suitable for power and heat production devices, being low in tar and moisture, preferably substantially tar and moisture free.

We have now found that moisture and tar extraction can be further improved with the use of a microcellular open cell polymer filter.

Accordingly in a further aspect of the invention there is provided a polymer filter comprising a microcellular open cell polyHIPE polymer comprising pores in the range 0.1 to 300 micron (primary pores) and optionally additionally in the range 300 to 10,000 micron (coalescence pores), wherein the polymer is effective in absorbing water and tar from gas, and a method for the preparation thereof.

Both the acid and neutralised salt form of the sulphonated Micro-cellular polymers (they are also known as PolyHIPE Polymers) can be used as water absorbent materials. These polymers are prepared using the teaching of our previous patent application, (Microcellular polymers as cell growth media and novel polymers, EP 1 183 328; U.S. Ser. No. 09/856,182). It is possible to use polymers with primary and optionally additionally coalescence pores for water absorption. These pore types are described as follows: Primary pores in the range 0.1-300 μm; for example small pore size: 0.1-0.5 μm and large pore size: 0.5 to 300 μm.

Coalescence pores in the range 300-10,000 μm. Preferably coalescence pores have pore size in the range 300 to 1000 μm.

Polyhipe of particular pore diameter may be obtained by methods described hereinbelow. In open cell polymers, intercell communications are known as interconnects. PolyHIPE may have any desired ratio of interconnect (d) to pore (D) diameter, for example in the range $0<d/D<0.5$, preferably in the range $0.1<d/D<0.5$ when the pore diameter is approximately less than 200 micron. Interconnects may have diameter in a range of up to 100 micron, preferably 0.001 to 100 micron, more preferably 1-50 micron.

Polyhipes are commercially available or may be prepared using methods as disclosed in U.S. Pat. No. 5,071,747 and in additional patent publications referred therein or as hereinbelow described.

The generic polyhipe polymer which is commercially available comprises polyvinyl polyhipe and is made up of oil phase monomers styrene, divinyl benzene (DVB) and surfactant (Span 80 sorbitan monooleate), and may be in rigid or flexible form depending on the relative proportions of monomers, additionally in flexible form including monomer 2-ethylhexyl acrylate, and in the aqueous phase an amount of potassium persulphate as aqueous phase initiator.

However, due to the presence of sulphur in the polymer, its use in gas cleaning may not be environmentally desirable. Therefore, we prefer to use other forms of micro-cellular polymers.

When the use of sulphur groups in the polymer is not desirable, it is preferable to use oil phase initiators such as lauryl peroxide (1% of the oil phase).

A first novel polyHIPE polymer comprised in a filter of the invention therefore incorporates oil phase initiator, preferably 1,1-azobis(cyclohexane carbonitrile) or lauryl peroxide in 1% of the oil phase of the emulsion.

A second novel polyHIPE polymer comprised in a filter of the invention incorporates monomer (such as 2-vinyl pyridine) to render the polymer adsorbent without causing emulsion breakdown, preferably present in an amount of 5-10%. Novel polymers may additionally incorporate monomer (such as 2-ethyl hexyl acrylate) to incorporate elasticity and improve mechanical shock absorbance and good attrition characteristics. Elasticity is also useful to enhance the water uptake capacity of the hydrophilic polymer. The preferred value of the 2-ethylhexyl acrylate concentratiori is up to Y=30% but more preferably Y=15%.

A third novel polyHIPE polymer comprised in a filter of the invention incorporates vinyl pyridine monomer (with or without 2 ethyl hexyl acrylate monomer) in the form of a skin-core polyhipe structure in which the core of the polymer is sulphonated but the skin is non-sulphonated. but yet still water adsorbent. This is done by injecting small amount of sulphuric acid to the core of the polymer and subsequently sulphonating this polymer using known methods. This ensures that the sulphur containing part is encapsulated but yet that part of the polymer can adsorb water.

We discovered that the polymers should not be dried excessively during the 'drying stage'. Excessive drying results in the reduction in water absorption capacity of the polymer as well as in reduced rate of water uptake. Typically, the water absorption capacity of these polymers is 10-12 times of their own weight.

The polymer of the invention may be natural or synthetic, soluble or insoluble, optionally (bio)degradable crosslinked polymer, preferably selected from proteins and cellulose, polyacrylamide, polyvinyl in rigid or flexible form, poly(lactic acid), poly(glycolic acid), polycaprolactone, poly(lactide/glycolide) and polyacrylimide.

The process for the preparation of microcellular polyhipe polymers comprises in a first stage the formation of a high internal phase emulsion (HIPE) of dispersed phase in continuous phase, wherein the dispersed phase may be void or may contain dissolved or dispersed materials, and monomers, oligomers and/or pre-polymers are present in the continuous phase, homogenisation and polymerisation thereof, by means of in the first stage introducing the dispersed phase by controlled dosing into the continuous phase with controlled mixing at controlled temperature to achieve an emulsion, and subsequently homogenising for controlled period under controlled deformation and polymerising, under controlled temperature and pressure.

Type-1 Pores (Basic pores): This is the basic pore structure the size of which is determined at the emulsification stage of the PHP formation. Therefore, the pore size is mainly determined by the deformation (flow) history of the emulsion. The integrity of these pores are kept during polymerisation and the interconnects are formed at this stage. Depending on the chemistry of the oil and aqueous phases, phase volume and the polymerisation conditions such as temperature and pressure, the interconnect size can be controlled in the range $0<d/D<0.5$.

Type-2 Pores (Coalescence pores): This type of pore architecture is obtained through the controlled coalescence of the Type-1 pores during polymerisation. The dispersed phase droplets in the emulsion of the PHP are coalesced by the addition of water soluble polymers into the aqueous phase, or by adding slightly hydrophilic oils (such as styrene oxide) to the oil phase or by elevating the concentration of monomers in the emulsion. The interconnect size in this case is the same as that of the Type-1 pores which form a matrix incorporating the coalesced pores. However, due to the fact that the coalesced pores are very large compared with the basic pores, the d/D ratio is very small.

Very small pore size emulsions (0.1 to 0.5 μm) are obtained using very high deformation rate flows in which the flow is predominantly extensional and the emulsification temperature is as low as possible. Large pore size emulsions (0.5 to 300 μm, for example approaching 200 μm) are obtained at high temperatures and just above the critical deformation rate below which the emulsion will fully or partially invert, for example to an oil-in water type system. The critical deformation rate may be determined by varying, for example the rate of addition or rate of deformation during mixing for a given system. These emulsions should also be processed in a short time using predominantly shear flows.

Very large pore emulsions (300 to 10,000 μm, preferably to 1,000 μm) are obtained through the method of controlled pore coalescence during polymerisation. There are two methods of achieving controlled coalescence: 1) by adding into the aqueous (dispersed) phase a known amount of water soluble polymer or 2) by adding 'filler' solutes into the continuous oil phase. In both methods, the concentration and the type of these additives are important. If the concentrations are low, these additives result in polyhipe polymers with pores in the range of 1-200 μm with some desired properties. If the concentration is above a certain value, the coalescence pores start to form. In this case, the pore size is dictated by the size of the pores before the start of coalescence, temperature of polymerisation and concentration, molecular weight and type of additive.

The emulsion may be obtained from any desired immiscible phases forming a continuous and a dispersed phase, preferably from aqueous and non-aqueous phases, more preferably aqueous and oil phases. The emulsion obtained may be an aqueous in oil emulsion or oil in aqueous emulsion.

By means of controlled dosing the dispersed phase into the continuous phase, it is possible to achieve the desired emulsion. In a batch mixer, dosing of the dispersed phase is preferentially conducted from the bottom of the mixer, using either single or multiple entry points. Multiple entry feed resulted in larger pore emulsions. If the dosing rate was very fast, mixing created by the emerging jet of aqueous phase was too severe and therefore the emulsion pore size decreases. Therefore, this combination of multiple-feed points with a relatively prolonged dosing created large pore emulsion. After the completion of dosing, the emulsion should be homogenised but if the homogenisation period was long, pore size decreased.

Controlled mixing as hereinbefore defined may be critical or extended. Critical mixing is sufficient mixing to cause the dispersion of aqueous phase into the oil phase without phase inversion. Critical mixing is obtained by use of a homogeneous mixing field whereby pore size is substantially uniform preventing emulsion breakdown and phase inversion.

Mixing may be by any means suited to provide a homogenous mixing field substantially throughout the total volume of the two phases and is preferably by multiple blade, multiple jet and the like mixing.

We have previously found that, contrary to the teaching of U.S. Pat. No. 5,071,747, the achievement of a stable emulsion with large pore diameter is obtained by minimising the intensity of mixing. Accordingly by means of dosing, homogeneous mixing and the like a stable emulsion may be obtained dispensing with the need for intense mixing. Homogenisation can be carried out in an external loop using a pump, such as a gear pump or screw pump which can also be attached to a static or dynamic mixer. Types of static or dynamic mixers suitable for this type of homogenisation are described in: Akay, G.; Irving, G. N.; Kowalski, A. J.; Machin, D. Dynamic mixing apparatus for the production of liquid compositions. U.S. Pat. No. 6,345,907, Feb. 12, 2002, and Akay, G. Method and apparatus for processing flowable materials and microporous polymers. International Patent Application. PCT Publication WO 2004/004880, Jan. 15, 2004.

Dosing, emulsifying and homogenisation may be conducted at any suitable temperature depending on the pore size in the final Polyhipe polymer. If the desired pore size is large, the preferred temperature is high, but nevertheless, below the boiling point of the lowest boiling phase. An aqueous phase as the lowest boiling phase, boils at around 100° C. It has been found that the process of the invention employing emulsification temperature of 60° C. or greater results in polymers being obtained having pore size in excess of 60 micron. Increase of emulsification temperature above 60° C. results in dramatic increase in pore size by an amount greater than that achieved for a similar increase in temperature below 60° C.

The maximum emulsification temperature may be greater than the normal boiling temperature of the lowest boiling phase, for example the lowest boiling phase may include any suitable component adapted to raise the boiling point. Preferably the aqueous phase includes an electrolyte which is stable at 100° C. and is potentially inert. By this means the process is preferably carried out at elevated pressures when the temperature is above the boiling point of the monomer. The preferred temperature range for high pore size emulsions is 70-110° C.

Emulsification and subsequent polymerisation can be carried out at temperatures above the normal boiling point of the aqueous or continuous phase materials, by increasing the pressure above atmospheric using closed continuous processing equipment.

The process may be carried out with use of additional aqueous or oil phase initiators, cross linking agents, fillers and the like and it is preferred that these are stable at the maximum operating temperature as hereinbefore defined. Selection of initiators, cross linking agents and the like is made with reference to the acceptable viscosity of the phases for emulsifying and homogenising. It may be acceptable to reduce the amount of cross linking agent required by use of a proportion of pre-polymers and partly cross linked pre polymers, optionally with the use of a suitable oil phase filler to increase oil phase volume and reduce effective viscosity.

Preferably the process of the invention is characterised by use of an initiator in the oil phase, together with or in place of an aqueous phase initiator as known in the art. Aqueous phase initiators may be employed for operation at lower temperatures and include sodium or potassium persulphate. For operation at elevated temperature above 80° C. oil phase initiators are preferably used for, example, 1,1-azobis (cyclohexanecarbonitrile) or lauryl peroxide.

Cross linking agent may be for example divinylbenzene (DVB). If the polyhipe is required to be biodegradable, hydrolyzable crosslinks can be obtained. These crosslinking agents are ethylene diacrylate, N-N'-diallyl tartardiamide, N-N (1,2, dihydroxyethane)-bis-acrylamide, and N-N'-N''-triallyl citrictriamide. However, in this case of biodegradable crosslinkers, the polymer itself should be biodegradable. These polymers are poly(lactic acid), poly(glycolic acid), poly $\epsilon$-caprolactam and polyacrylimide.

When water soluble polymers are needed to form the microcellular structure, they need to be crosslinked. In this case of such polymers, monomer (such as acrylamide) is dissolved in water and a HIPE emulsion is formed dosing this monomer solution into a hydrocarbon liquid such as hexane or toluene in the presence of suitable surfactant, initiator and crosslinker.

Proteins and cellulose can also form microcellular structures. In this case, these materials together with a suitable emulsifier are dissolved in a suitable aqueous phase (water for proteins and Schweitzer's reagent, $Cu(NH_3)_4(OH)_2$ for cellulose) and dosed into a hydrocarbon liquid to form a water continuous HIPE. Crosslinking is achieved by immersing the HIPE into a solution of glutaraldehyde (for proteins) or acid solution (cellulose).

The process may include introduction of any suitable modifier as hereinbefore defined prior to or subsequent to polymerisation. For example modifiers may be introduced in the dispersed aqueous phase and dosed into the continuous phase as hereinbefore defined. Alternatively a post polymerisation modification stage is employed, which may simply take the form of removing surfactant, electrolyte and unreacted monomer, coating, further polymerisation or reaction on the existing polymer surface. Modifying agents and modification techniques are known in the art.

Polymerisation is carried out under known conditions of time and temperature for the respective monomer, oligomer and or prepolymer to be polymerised, as known in the art.

Preferably polymer is polymerised in individual molds so that a skin is formed. This has the benefit of preventing attrition of the polymer during use in a packed bed. The alternative method of cutting the polymer into packing material can result in the fragmentation into small particles.

In a further aspect of the invention there is provided a novel polyHIPE polymer comprising polyvinyl polyhipe and is made up of oil phase monomers styrene, divinyl benzene (DVB) and surfactant (Span 80 sorbitan monooleate), additionally incorporating monomer (such as 2-vinyl pyridine) to make the polymer water adsorbant without causing the emulsion to separate, preferably present in an amount of 5-10% and/or monomer (such as 2-ethyl hexyl acrylate) to incorporate elasticity and improve mechanical shock absorbance and good attrition characteristics, characterised in that the polymer comprises pores in the range 0.1 to 300 micron, eg 0.1 to 0.5 micron up to 200 micron as primary pores and optionally additionally if the concentration of the co-monomers are high, coalesce pores in the range up to 10,000 micron, eg up to 1,000 micron are formed.

In a further aspect of the invention there is provided the use of a gasifier, method for gasification, gasification system and method, gas filter and novel polymer in the gasification of solid fuel as hereinbefore defined, preferably to generate combustible gases for use in energy generation, for example using internal combustion gas engines, gas turbines, dual-fuel diesel engines or fuel cells.

A detailed embodiment of the invention, as well as further preferable features will now be described with reference to the following drawing.

Figure 1:
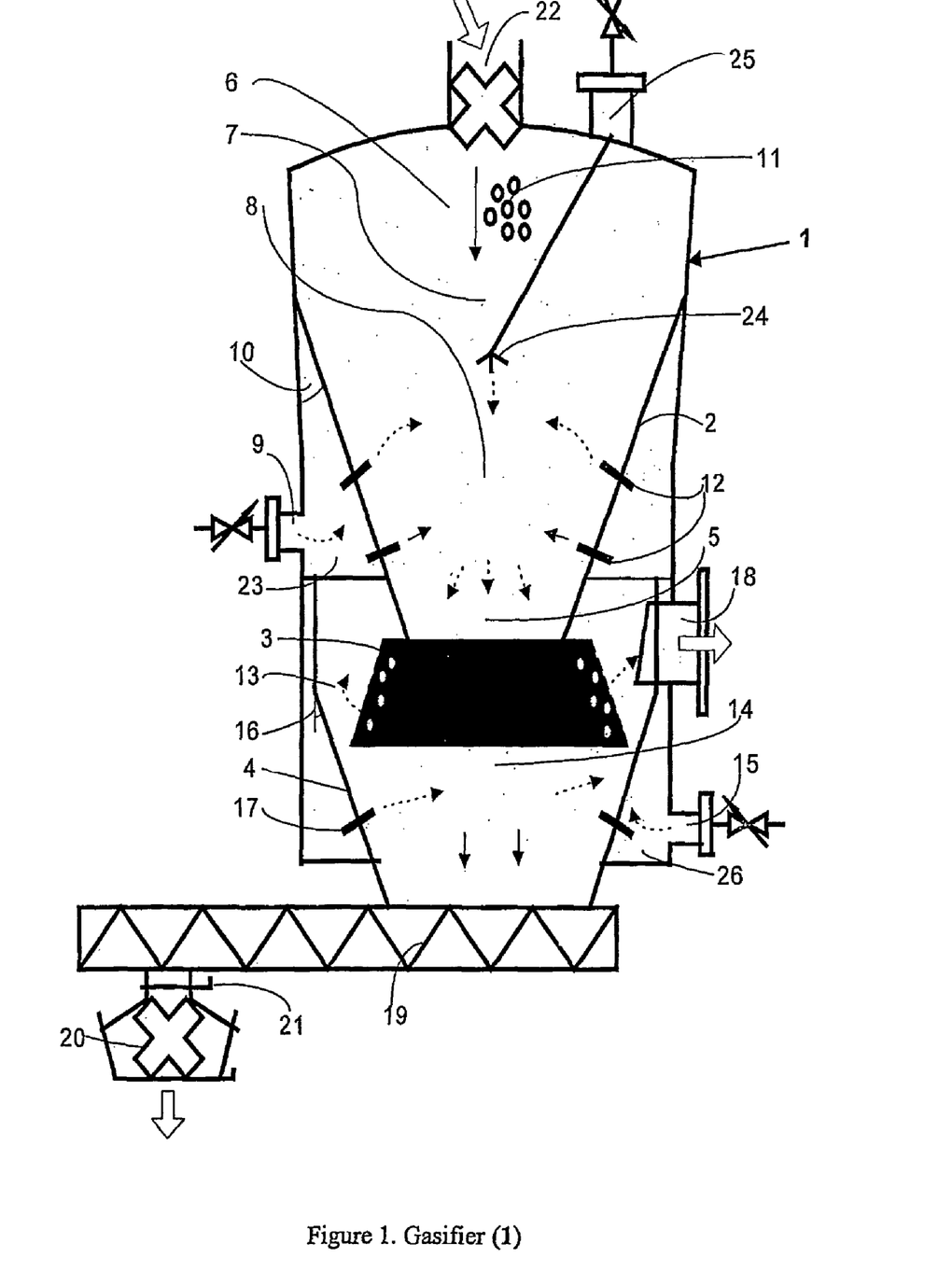
FIG. 1 is a schematic diagram showing a gasifier according to the present invention.

The gasifier 1 shown in FIG. 1 can be subdivided into five overall zones. At the upper end of the gasifier, where fuel is introduced by means of a top fuel air-lock rotary valve 22, is the fuel storage and drying zone 6. Below this zone is a pyrolysis zone 7.

The first oxidation zone 8 is located below the pyrolysis zone 7 and has air supplied to it through air intake nozzles 12 in the first air distribution throat 2, which defines the lower edge of the zone, and in the upper part of the reduction zone 5. This throat is inclined at an angle 10 of 10 to 40°, preferably about 20°, so as to aid the flow of fuel down the gasifier, and may be curved as shown. An angle of greater than 40° leads to restricted fuel flow. The throat 2 is rigidly welded to the inner surface of the gasifier 1.

A central air nozzle set 24 can aid air distribution in the first oxidation zone, and is particularly useful when the diameter of the throat exceeds about 0.5 meter. Such a nozzle is preferably located centrally above the first air distribution throat 2. The air is supplied to the air intake nozzles 12 from a ring duct 23 which is formed between the first air distribution throat 2 and the outer shell of the gasifier. Air is admitted into this ring duct 23 by means of an primary air intake valve 9. If a central air nozzle set 24 is present this is supplied air from a valve 25 whose operation is connected with that of the primacy air intake valve 9.

In a gasifier where there is no central air nozzle set 24, it is preferred that about two thirds of the air intake nozzles 12 are located on the surface of the inclined throat 2, and that the other third are located in the reduction zone 5 at least 20 cm above the perforated part 3 (see below). If a central air nozzle set 24 is present, then an equal number of nozzles are located in each location.

The throat 2 leads to a reduction zone 5 which descends as a conical tube into the second oxidation zone 14. The cylinder which circumscribes the reduction zone 5 has a perforated catalysis shell part 3 so as to clean and to allow the escape of the product gas 13 directly into the second oxidation zone at the level for the gas discharge pipe 18. The angle that the perforated catalysis shell 3 makes with the vertical direction is 10 to 40°, preferably about 20°.

The second oxidation zone 14 has air 15 supplied to it through air nozzles 17 which are located in the second air distribution throat 4, which defines the lower edge of the zone. This throat is also inclined at an angle 16 of 10 to 40°, preferably about 20°, so as to aid the flow of fuel, and similar considerations as to the angle of inclination of the first air distribution throat 2 apply here. The throat 4 is rigidly welded to the inner surface of the gasifier 1, and is preferably aligned, or more preferably symmetrical, with the first air distribution throat 2. The term 'symmetrical' as used herein means that the two throats 2 and 4 have the same shape and are located about a common vertical axis.

The air is supplied to the air intake nozzles 17 from a ring duct 26 which is formed between the second air distribution throat 4 and the outer shell of the gasifier. Air is admitted into this ring duct 26 by means of a secondary air intake valve 15.

At the base of the gasifier 1, a screw-conveyor auger 19 is located to remove the ash-slag mixture remaining at the end of the gasification process. The ash is discharged by means of an air-lock rotary valve 20 with a sliding gate valve 21 on top.

Figure 2:
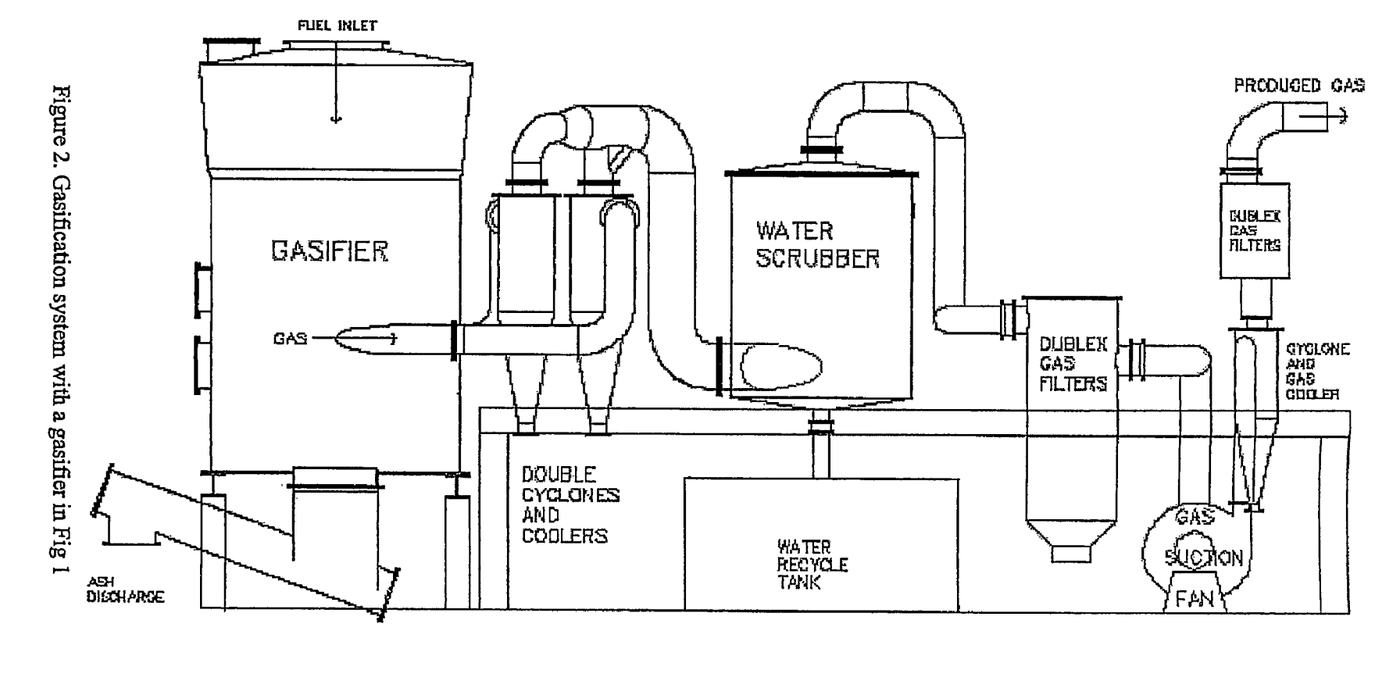
FIG. 2 is a schematic diagram showing the gasification system with a gasifier located in FIG. 1 according to the present invention.

Gas produced in the gasifier is removed by means of a vortex discharge pipe 18 which is preferably maintained at a reduced pressure, i.e. less than atmospheric pressure, by the use of a gas suction fan (FIG. 2).

The upper part 6, 7, 8, 5 of the gasifier 1 operates in a similar manner to a conventional downdraft gasifier, whilst the lower part 14 of the gasifier reactor 1 operates in a similar manner to an updraft charcoal gasifier.

The cross-sectional area of the first and second oxidation zones 8, 14 is less than that of the fuel storage zone 6 and the pyrolysis zone 7. In order to maintain uniform temperature distribution across these zones, the cross-sectional area of the reduction zone 5 is smaller than that of the first and second oxidation zones 8, 14.

For the gasification process, it is preferred that uniform size briquettes or pellets of fuel 11 (such as biomass or waste carbonaceous materials) are used so as to achieve a uniform air distribution in the throat section above the reduction zone 5. It is also preferred that the maximum diameter of the briquettes of fuel is not larger than one eighth of the narrowest part of the gasifier 1, so as to prevent bridge formation in the first oxidation zone 8 above the throat 2.

Thermocouples (not shown) may be provided throughout the gasifier so as to provide monitoring of the gasification process. A bridge-breaking poker and/or vibrator (not shown) may also be provided to enable the destruction of any bridge that forms in the first oxidation zone 8 above the throat 2 or to prevent the accumulation of ash. The poker and/or vibrator can be attached at the top outer section of the gasifier 1.

The gasifier 1 shown in FIG. 1 is operated continuously after initial ignition and start-up, which usually takes about 5 to 15 minutes, depending on fuel consumption.

Naturally dense or densified biomass and/or waste (carbonaceous fuel) are loaded into the gasifier 1 from the top fuel valve 22. After the solid fuel loading is complete, fuel valve 22 and ash discharge valve 21 are temporarily stopped and sealed, and the gas suction pump (FIG. 2) attached to the discharge pipe 18 switched on, so that reactor reaches a pressure of about 5 to 10 mbar below atmospheric pressure, at which point primary intake air is introduced to the oxidation zone 8 via a ring duct 23, by opening the control valves 9 and 25. A gas burner (not shown) located in the ring duct 23 issued as an ignition device so as to ignite and heat up the fuel in the oxidation zone 8, until combustion initiates.

The distribution of the air intake nozzles 12 and 24 allows homogenous penetration of air into the oxidation zone 8 to support combustion of the fuel to achieve high uniform temperatures (>1000° C.).

Once an operation temperature of above 1000° C. has been established in the first oxidation zone 8, external ignition is stopped. Simultaneously, perforated catalysis jacket 3 can be activated by using suitable metal base catalyst to allow the hot product gas to pass through. This internal microporous catalysis arrangement in the gasifier 1 will enable to produce tar free product gas 13 before gas leaves the gasifier 1. The operating temperature of the first oxidation zone and hence the through put of the gasifier is subsequently controlled by increasing or decreasing air intake 9. The gasifier 1 can efficiently be operated at as low as 20% of its maximum throughput capacity by controlling the air intakes 9, 15 and 25.

The high temperature achieved in the first oxidation zone 8, results in a temperature of about 400 to 600° C. in the pyrolysis zone 7, and about 100° C. in the drying zone 6 by radiation of the heat upwards.

During the pyrolysis, which may take about 20 minutes, the dense uniform size fuel 11 releases combustible gases and forms charcoal without the supply of oxygen. The following reactions are typical of those that take place in the pyrolysis zone:

| Char Formation |
| --- |
| $0.17 C_6H_{10}C_5 \rightarrow C + 0.85 H_2$    $\Delta H_{300K} = -80$ kJ/g mole |
| Water Gas Shift |
| $CO + H_2O \rightarrow CO_2 + H_2$    $\Delta H_{300K} = -33$ kJ/g mole |
| Methane Formation |
| $CO + 3H_2 \rightarrow CH_4 + H_2$    $\Delta H_{300K} = -205$ kJ/g mole |
| $CO_2 + 4H_2 \rightarrow CH_4 + 2H_2O$    $\Delta H_{300K} = -192$ kJ/g mole |
| $2CO + 2H_2 \leftarrow \rightarrow CH_4 + CO_2$    $\Delta H_{298K} = -247.3$ kJ/mol |

The charcoal is then dragged under its own by gravity to the first oxidation zone 8 followed by reduction zone 5 wherein exothermic and endothermic reactions respectively take place at high temperatures.

The following reactions are typical of those that take place in the oxidation zone 8.

| Partial Oxidation |
| --- |
| $C + \frac{1}{2}O_2 \rightarrow CO$    $\Delta H_{298K} = -268$ kJ/g mol |
| $CO + \frac{1}{2}O_2 \rightarrow CO_2$    $\Delta H_{298K} = -285.0$ kJ/g mol |
| $H_2 + \frac{1}{2}O_2 \rightarrow H_2O$    $\Delta H_{298K} = -241.8$ kJ/g mol |

An advantage of operating the oxidation zone 8 at a temperature of at least 1000° C. is that any tars in the pyrolysis gases produced in the pyrolysis zone 7 can be cracked to some extent to produce lower chain length hydrocarbons.

In the reduction zone 5 (also often referred as gasification zone), the biomass char is converted into product gas by the reaction with hot gases from the above zones 6, 7 and 8.

The following reactions are typical of those that take place in the reduction zone 5:

| Methane Formation |
| --- |
| $C + 2H_2 \rightarrow CH_4$    $\Delta H_{298K} = -74.9$ kJ/mol |
| Boudouard Reaction |
| $C + CO_2 \rightarrow 2CO$    $\Delta H_{298K} = -172.5$ kJ/mol |
| Water Gas Reaction |
| $CO_2 + H_2 \leftarrow \rightarrow CO + H_2O$    $\Delta H_{298K} = -41.2$ kJ/mol |
| $C + H_2O \leftarrow \rightarrow CO + H_2$    $\Delta H_{298K} = -131.3$ kJ/mol |

The product gases from these zones are then sucked through the perforation jacket 3 which may be filled with highly active microporous catalysis in the wall surrounding the reduction zone 5 and exit the gasifier through the discharge pipe 18. The use of the perforated part 3 in the wall surrounding the reduction zone 5 allows the product gases to crack residue tars. It also reduces the amount of ash and particulates picked up by the product gases, particularly in the second oxidation zone 14, and carried out of the gasifier 1.

The remaining char particles which are not completely gasified in the reduction zone 5 fall into the second oxidation zone 14 for secondary combustion and gasification of any remaining char in ash (by similar reactions that occur in the first oxidation zone 8). The product gas formed in the secondary combustion chamber 14 is directed upward to the discharge 18 due to the negative pressure applied to the discharge 18. The amount of secondary oxidation required will depend on the remaining char content in ash of the fuels. High ash fuels, such as sewage sludge, leather waste, petroleum residue sludge, house-hold waste (RDF), bone meal, chicken and cattle manure, usually result in low carbon conversion in conventional gasifiers due to the isolation of some carbon by ash in the main oxidation zone. In the gasifier of the present invention, the amount of secondary oxidation in the second oxidation zone 14 is controlled by the amount of air admitted by the secondary air intake valve 15.

The secondary oxidation zones typically operate at between 650 and 850° C. Mixtures of hot combustible gases (at about 450° C.) leave the gasifier 1 from the discharge pipe 18 after passing through perforated catalysis zone 3. In FIG. 2, the product gas, which may contain a small amount of tar (less than 20-50 mg/m$^3$) and particulate matters, is discharged to a cyclone for particulate and fly ash removal and then into one or more heat exchangers and gas-water scrubbers with final gas filters for further processing, such as precipitation of any tars or moisture in the product gas.

During normal operation of the gasifier 1, the ash auger 19 and the rotary valve 20 are operated continuously such a rotation rate that to extract slag from the reactor so that gasification process is not disturbed. The mode of operation of ash auger 19 depends on the ash content of gasified biomass and/or waste.

It is preferred that, the gasifier is operated such that the carbon content of the ash and slag removed from the gasifier is less than 3%.

FIG. 2 illustrates a gasification system comprising in series: the gasifier of the invention, a water scrubber, a double polymer filter unit working in tandem, a fan, a further double polymer filter unit and means to exit product gas for energy generation.

The gas from the water scrubber can also bypass the first double polymer filter unit which is preferably in the form of two polymer box filters if needed (this can happen during start up when the tar content is high. During the normal operation, while the gas is going through one box filter, the polymer is re-generated in the second box filter by blowing hot exhaust gas coming from the internal combustion engine. The regeneration can be conducted at 80 C. while the gas cleanup is conducted at temperature below 40 C.

During regeneration using polymer in the second box filter, exhaust gases are also cleaned through absorption by the polymer and particulate matter is also retained.

This filtration in tandem is repeated at the fan exit where the pressure is high which causes more tar and moisture condensation in the second double polymer filter unit which carries out water/tar absorption. There are restrictions on the gas temperature before it can be fed into the internal combustion engine. Preferred temperature is about 40 C. Therefore the gas from the fan outlet may have to be cooled. This helps the removal of the tar and moisture by the micro-porous polymer in the filter box at the fan exit.

The invention is now illustrated in non limiting manner with respect to the following examples.

EXAMPLE 1

Method for Operating Gasifier According to the Invention

1. Start-Up

The start-up stage includes all operations required until a steady state is reached when the gas quality for the engine is stable and uninterrupted. Pre-weighed batches of biomass, fuel are loaded into the hopper to a predetermined level. Then, the air fan and the water scrubber circulation pump are switched on. The fuel is ignited on the grate using solid fuel igniters.

2. Gasifier Operation

The data measured are the fuel flow rate, gas flow rate, gas composition, temperature and pressure. Temperatures were recorded with an analogue to digital converter every 15 s for inlet air, drying zone, pyrolysis zone, throat and scrubber outlet. The pressure drops were also measured at the gasifier and water scrubber outlet. The product gas flow rate was measured by a gas flow meter located after the suction fan. The amounts of tar and condensate in the product gas were determined from gas samples taken at the gasifier and water scrubber outlets.

Clean and dry wood chips and charcoal for use as filters are placed in the respective trays in the box filter. The gas flow meter is regulated to the required flow rate. The air fan is switched on followed by the circulation pump (water scrubber pump) at the side of the water tank is turned on. Then the pilot lighter to ignite the product gas is lighted. The product gas flow rate was measured by gas flow meter located after suction fan. A circulation fan (gas booster fan) is used to provide the suction effect, which would be exerted by an engine coupled to the gasifier so as to pull the product gas out of the gasifier, through the scrubber and up the stack where it is flared after ignition by a pilot burner. Temperature was measured continuously at six different locations by thermocouples and data was recorded on a computer.

3. Gas Cleaning

A U-tube apparatus was used to collect tar and condensate, and to clean the gas samples for gas analysis. The U-tube apparatus, basically, consists of a stainless steel sampling probe 5-mm diameter linked to a plastic pipe. It contains two Pyrex "U" tubes in series for trapping tar and moisture. The first trap contains the spherical glass beads with a smaller diameter to provide a large surface area to the wet producer gas, while the second trap contains silica gel between two pieces of glass wool. A vacuum pump (AEI type BS 2406, 0.25 hp) was used to draw the gas through the sampling tube. A rotameter (MFG Fischer, 10 l/min) was placed between the U-tubes and the vacuum pump. Time for the flow of gas through the tube was noted at constant gas flow rate to find the tar content of the producer gas.

4. Shut Down

Shutdown procedure includes all the actions to safely seal the gasifier. Computer, water scrubber, gasifier air nozzles, circulation fan and exhaust fan of boiler are shut down in an orderly sequence with the off gas burner remaining on using a secondary natural gas burner until no combustible gas is produced.

5. Data Processing

For a full mass balance, cleanup procedure includes all procedures required to collect tar, char, ash and condensate. After the reactor cooled down, the amounts of ash and char were determined by collecting those from ash chamber. Finally, the top plate of the gasifier was opened so that all unused sugar cane bagasse were carefully removed and monitored. The average feed rate of fuel was calculated by dividing the total sugar cane bagasse consumed by the total operating time of the gasifier.

6. Fuel Preparation

Biomass fuel consistency is important in gasification in order to achieve continuous flow through the reactor and to provide reliable product gas composition and calorific value for the downstream energy conversion processes. Furthermore, densification of the biomass fuel reduces the reactor size, while shape and size of the densified fuel reduces fluctuations in gas and fuel flow rates as well as the subsequent product quality. For already dense biomass fuels such as wood chips, further densification is not crucial but desirable. However, for fuels with large variations in its content and low bulk density, such as municipal solid waste, it is absolutely inevitable. Therefore, municipal solid waste, after the removal of metals and glass, is either heat treated to obtain cellulose rich powder or it is shredded and subsequently briquetted to densify the fuel.

When the material to be gasified is liquid, such as refinery oil sludge, it can either be dried to obtain solid material or it can be mixed with a solid carrier, preferentially biomass. One such biomass used was bone-meal which contains large quantities of calcium. Therefore it is useful to remove sulphur from the oil by forming calcium sulphate.

7. Gas Analysis

A gas chromatograph (Shimadzu GC-8A) was used to analyse the gas samples using helium as a carrier gas. Gas Chromatography (GC) has dual columns (chromosorp 101 and molecular sieve) and a thermal conductivity detector. Parameters influencing retention time and quantity of the gases for each column are given in Table 4.1. At the same time the gas was passed through the U-tube apparatus to find the amounts of tar and condensate in the produced wet gas. Humidity of air in the near the test apparatus was measured form time to time throughout the experiment to make accurate calculations for the mass and energy balance.

EXAMPLE 2

Gasification Results with Various Solid Feedstock

TABLE 2A

| | FUEL INPUT | | | |
| --- | --- | --- | --- | --- |
| COMPONENTS | Sewage Sludge | Hazelnut Shells | Wood-waste Chips | Leather Waste |
| Size (mm) | 35.0 × 10.0 × 5.0 | 17.8 × 16.5 × 8.5 | 50.0 × 30.0 × 8.5 | 70.0 × 50.0 × 50 |
| Abs. Density (kg/m3) | 315.04 | 944.84 | 836.63 | 945.13 |
| Bulk Density (kg/m3) | 230.72 | 319.14 | 250.28 | 537.30 |
| C (%) | 39.48 | 46.76 | 43.43 | 43.59 |
| H (%) | 6.19 | 5.76 | 6.08 | 6.95 |
| O (%) | 25.46 | 45.83 | 46.29 | 32.28 |
| N (%) | 3.93 | 0.22 | 0.67 | 10.84 |
| S (%) | 1.45 | 0.67 | 0.43 | 1.45 |

TABLE 2A-continued

FUEL INPUT

| COMPONENTS | Sewage Sludge | Hazelnut Shells | Wood-waste Chips | Leather Waste |
|---|---|---|---|---|
| Ash (%) | 23.51 | 0.77 | 3.11 | 4.89 |
| Moisture Content (%) | 11.75 | 12.45 | 14.87 | 11.23 |
| Volatile matter (%) | 53.48 | 62.70 | 64.79 | 65.75 |
| Fixed Carbon (%) | 11.27 | 24.08 | 17.24 | 18.23 |
| HHV (IGT) (MJ/kg) | 17.86 | 18.08 | 17.20 | 20.54 |
| HHV (data) (MJ/kg) | 17.14 | 17.36 | 16.43 | 19.93 |

TABLE 2B

GASIFIER OUTPUT

| | Product Gas | | | | | | | | |
|---|---|---|---|---|---|---|---|---|---|
| FUEL TYPE | $H_2$ (dry) (%) | $O_2$ (dry) (%) | $N_2$ (dry) (%) | $CH_4$ (dry) (%) | CO (dry) (%) | $CO_2$ (dry) (%) | $C_2H_2$ (dry) (%) | $C_2H_6$ (dry) (%) | GCV (dry) (MJ/Nm$^3$) |
| Sewage | 9.25 | 1.28 | 63.04 | 1.83 | 13.39 | 9.63 | 1.13 | 0.43 | 4.82 |
| Hazelnut | 13.13 | 0.93 | 53.33 | 2.18 | 20.66 | 9.52 | 0.15 | 0.11 | 5.40 |
| Wood | 16.58 | 0.07 | 53.38 | 2.04 | 14.32 | 13.22 | 0.27 | 0.13 | 5.11 |
| Leather | 10.12 | 0.28 | 56.39 | 1.11 | 21.43 | 10.16 | 0.23 | 0.28 | 4.92 |

TABLE 2C

Flue Gas Emission Values (mg/m$^3$)

| | $NO_x$ | $SO_2$ | $NO_2$ | NO | $NH_2$ | $H_2S$ | HCN | HF | HCl |
|---|---|---|---|---|---|---|---|---|---|
| Sewage sludge | 14-45 | 102-112 | trace | 22-49 | NA | NA | NA | NA | NA |
| Hazelnut shells | 10-15 | 20-70 | trace | 12-25 | NA | NA | NA | NA | NA |
| Wood waste | 8-12 | 13-24 | trace | 11-27 | NA | NA | NA | NA | NA |
| Leather waste | 8-14 | 1-7 | 1-2 | 4-12 | NA | NA | NA | NA | NA |

TABLE 2D

Temperature Distribution

| | Throat Temperature $T_1$(° C.) | Pyrolysis Temperature $T_2$(° C.) | Drying Temperature $T_3$(° C.) | Product Gas Temperature $T_4$(° C.) | Engine inlet Temperature $T_5$(° C.) |
|---|---|---|---|---|---|
| Sewage | 1100 | 500 | 150 | 300 | 35 |
| Hazelnut | 1250 | 560 | 170 | 320 | 40 |
| Wood | 1150 | 500 | 130 | 280 | 30 |
| Leather | 1280 | 590 | 180 | 350 | 45 |

EXAMPLE 3

Gasification Results With Various Feedstock

TABLE 3A

| FUEL INPUT | | | | |
|---|---|---|---|---|
| COMPONENTS | Tyre Waste | Olive Pips | RDF MSW* | Heat Treated Clinical waste |
| Size (mm) | 1.5 × 0.5 × 1.5 | 70 × 50 × 70 | 1 × 3 × 1 | 10 × 20 × 10 |
| Abs. Density (kg/m3) | NA | 897.43 | NA | NA |
| Bulk Density (kg/m3) | NA | 502.16 | NA | NA |
| C (%) | NA | 48.00 | 46.70 | NA |
| H (%) | NA | 5.95 | 6.20 | NA |
| O (%) | NA | 32.46 | 29.90 | NA |
| N (%) | NA | 1.54 | 0.74 | NA |
| S (%) | 1.98 | 0.48 | 0.30 | NA |
| Ash (%) | 3.62 | 11.87 | 16.90 | 4.5 |
| Moisture Content (%) | 1.20 | 10.11 | 5.42 | 6.5 |
| Volatile matter (%) | 65.78 | 58.71 | 61.11 | 58.00 |
| Fixed Carbon (%) | 29.40 | 19.31 | 16.57 | 31.00 |
| HHV (IGT) (MJ/kg) | 35.01 | 18.03 | 20.25 | 23.25 |
| HHV (data) (MJ/kg) | 35.14 | 17.50 | 20.22 | NA |

TABLE 3B

| GASIFIER OUTPUT | | | | | | | | | |
|---|---|---|---|---|---|---|---|---|---|
| | Product Gas | | | | | | | | |
| FUEL TYPE | $H_2$ (dry) (%) | $O_2$ (dry) (%) | $N_2$ (dry) (%) | $CH_4$ (dry) (%) | CO (dry) (%) | $CO_2$ (dry) (%) | $C_2H_2$ (dry) (%) | $C_2H_6$ (dry) (%) | GCV (dry) (MJ/Nm$^3$) |
| Tyre Waste | 10.60 | 1.01 | 40.06 | 2.80 | 25.13 | 19.53 | 0.98 | 0.71 | 6.77 |
| Olive Pips | 10.01 | 1.80 | 61.10 | 2.50 | 12.90 | 10.10 | 1.30 | 0.17 | 5.04 |
| RDF-MSW | 12.15 | 1.20 | 52.00 | 2.73 | 18.17 | 12.23 | 1.09 | 0.43 | 6.05 |
| Clinical waste | | | | | | | | | |

TABLE 3C

| Flue Gas Emission Values (mg/m$^3$) | | | | | | | | |
|---|---|---|---|---|---|---|---|---|
| | $NO_x$ | $SO_2$ | $NO_2$ | NO | $NH_2$ | $H_2S$ | HCN | HF | HCl |
| Tyre Waste | NA | NA | NA | NA | NA | NA | NA | NA | NA |
| Olive Pips | 5 | 7 | trace | trace | NA | NA | NA | NA | NA |
| RDF-MSW | NA | NA | NA | NA | NA | NA | NA | NA | NA |
| Heat Treated Clinical waste | NA | NA | NA | NA | NA | NA | NA | NA | NA |

TABLE 3D

| Temperature Distribution | | | | | |
|---|---|---|---|---|---|
| | Throat Temperature $T_1$(°C.) | Pyrolysis Temperature $T_2$(°C.) | Drying Temperature $T_3$(°C.) | Product Gas Temperature $T_4$(°C.) | Engine inlet Temperature $T_5$(°C.) |
| Tyre Waste | 1300 | 700 | 300 | 450 | 42 |
| Olive Pips | 1150 | 450 | 140 | 250 | 37 |
| RDF-MSW | 1210 | 600 | 230 | 300 | 40 |
| Clinical waste | 1200 | 610 | 240 | 300 | 40 |

* RDF/MSW: Municipal Solid Waste

Conclusion

As shown in Tables 2A and 2B the operations gave good temperature control with all fuels giving a throat temperature in the first oxidation zone circa 1000 C. Product gas properties were excellent giving in all cases a good fuel composition for subsequent combustion. Particularly all fuels were characterised by 6 megaJoules/$m^3$, in excess of the minimum of 4 megaJoules/$m^3$ needed for combustion in a combustion engine.

As shown in Tables 3A and 3B This is suitable for clean ignition to give low emissions for example:
$NO_x$ 5 mg/$m^3$ and $SO_2$ 7 mg/$m^3$ and trace levels of $NO_2$ and NO.

EXAMPLE 4

Preparation of Polyhipe Polymer for Use in a Filter According to the Invention

The composition of the oil and aqueous phases are given below:
Oil Phase:
Styrene Monomer: (78-X-Y-Z)%
2-Vinylpyridine monomer: X %
2-Ethylhexyl acrylate monomer: Y %
Oil phase soluble initiator: Z %
Divinyl benzene (cross linking agent): 8%
Surbitan mono-monooleate (Span 80 non-ionic surfactant): 14%
AQUEOUS EPHASE: Water containing Z % potassium persulphate.

The preferred phase volume of the aqueous phase is 80-95%, more preferably, 90-95%.

The inclusion of the monomer 2-vinyl pyridine in high concentrations results in the breakdown of the emulsion. Therefore, the preferred value of X lies between 5-10%.

The use of 2-ethylhexyl acrylate is to make the microporous polymer elastic. Elasticity of the polymer results in better mechanical shock absorbance and good attrition characteristics. Elasticity is also useful to enhance the water uptake capacity of the hydrophilic polymer. The preferred value of the 2-ethylhexyl acrylate concentration is up to Y=30% but more preferably Y=15%.

Water phase and/or oil phase soluble initiator is present in amount Z=0-1%. Oil phase initiator is present when sulphur containing water phase initiator (potassium persulphate) is not used.

The preparation of the emulsion was carried out in a batch mixer from an oil phase and an aqueous phase, dosed at a predetermined rate while the emulsion was stirred at constant rotational speed. Dosing rate, deformation rate, mixing rate were predetermined as a function of volume of respective phases, diameter of the batch mixer and of the impellers, rotational speed of the impellers and homogenisation time.

In order to eliminate the differences in performance of different mixing conditions we characterise the mixing through:

$$\text{Dosing rate} \quad R_D = \frac{V_A}{t_D}$$

Deformation rate during dosing $R_E = V_A/(t_D V_0)$
Mixing rate $R_M = D_1 \Omega / D_0$ Where:
$V_A$=Volume of aqueous phase added over a period of time $t_D$
$V_o$=Volume of the oil phase placed in the batch mixer
$D_1$=Diameter of the impellers
$D_o$=Diameter of the batch mixer
$\Omega$=Rotational speed We also define $t_H$ as the homogenisation time and $t_T$ as the total mixing time.

$$t_T = t_D + t_H$$

Two flat paddle impellers (8 cm in diameter and 1.4 cm in width) were used in a mixing tank of 8.5 cm diameter. Impeller separation was 1 cm. 25 ml of oil phase is placed at the bottom of the tank and 225 ml of aqueous phase was dosed using 4 feed points. Temperature of the aqueous phase was ranged from −1.0 to 80° C.

In the polymer preparation with vinyl pyridine polymerisation is carried out at 40 C for 8 hours followed by 50 C for 8 hours and finally another 8 hours at 60 C. This ensures that the emulsion is not destabilised during polymerisation. We discovered that the polymers should not be dried excessively during the 'drying stage'. Excessive drying results in the reduction in water absorption capacity of the polymer as well as in reduced rate of water uptake. Typically, the water absorption capacity of these polymers is 10-12 times of their own weight.

The invention claimed is:

1. A gasifier for the gasification of biomass and waste to produce combustible effluent, comprising:
   a) a solid fuel valve that supplies solid fuel to a pyrolysis zone above a first oxidation zone and an air inlet that supplies oxygen to combust the fuel in the first oxidation zone;
   b) a first throat defining the lower edge of the first oxidation zone;
   c) a second throat defining the lower edge of a second oxidation zone;
   d) a reduction zone linking the first oxidation zone to the second oxidation zone; and
   e) a vortex discharge pipe for the combustible effluent;
   wherein gas flows in the first oxidation zone and the reduction zone in the same direction as fuel flow and gas flows in the second oxidation zone in the opposite direction to the fuel flow, and the cross-sectional area of the first oxidation zone is less than that of the pyrolysis zone.

2. A gasifier according to claim 1, further comprising a fuel storage and drying zone above the pyrolysis zone.

3. A gasifier according to claim 1, further comprising air distribution nozzles for providing air to the first and second oxidation zones, wherein said nozzles are provided in the first throat, the upper half of the reduction zone and the second throat.

4. A gasifier according to claim 1, further comprising a central air nozzle set above the first oxidation zone for supplying air to the first oxidation zone.

5. A gasifier according to claim 1, wherein a microporous catalyst zone is located below the reduction zone and links the first oxidation zone to the discharge pipe.

6. A gasifier according to claim 1, further comprising a grateless discharge mechanism beneath the second oxidation zone.

7. A gasifier according to claim 6, wherein the grateless discharge mechanism comprises a screw conveyor auger.

8. A gasifier according to claim 1, wherein the gasifier has a vertical axis and the first or second throat is inclined at an angle of between 10 and 40° to the vertical axis.

9. A gasifier according to claim 1, wherein the first throat and the second throat are symmetrically located with respect to each other.

10. A gasifier according to claim 1, further comprising a gas suction pump attached to the discharge pipe to maintain the pressure in the gasifier below atmospheric pressure.

11. A gasifier according to claim 2, wherein the cross-sectional areas of the first and second oxidation zones are smaller than that of the fuel storage and drying zone, and the cross-sectional area of the second oxidation zone is smaller than that of the pyrolysis zone.

12. A gasifier according to claim 11, wherein the cross-sectional area of the reduction zone is smaller than the cross sectional area of the first and second oxidation zones.

13. A gasification system comprising in series: the gasifier of claim 1, a water scrubber, a first double polymer filter unit working in tandem, a fan, a second double polymer filter unit working in tandem, and an exit for a product gas for energy generation leading to a location for clean ignition, such that only one half of each double filter unit operates in filter mode at any one time and the other half operates in regeneration mode.

14. A gasification system according to claim 13 wherein the filters are box filters comprising a microcellular polyHIPE polymer comprising primary pores of 0.1 to 300 microns or coalescence pores of 300 to 10,000 microns, for absorbing water and tar.

15. A gasification system according to claim 13, further comprising an internal combustion gas engine, gas turbine, dual-fuel diesel engine or fuel cell that generates energy from the combustible gas.

16. A gasifier of claim 5, wherein the catalyst is in a perforated catalysis jacket.

17. A gasifier according to claim 8, wherein the first and second throats are inclined at an angle of between 10 and 40° to the vertical axis.

18. A gasification system according to claim 13, wherein the exit is an effluent stack.

19. A gasification system according to claim 13, wherein the filters are box filters comprising a microcellular polyHIPE polymer comprising primary pores of 0.1 to 300 microns and coalescence pores of 300 to 10,000 microns, for absorbing water and tar.

20. A gasification system according to claim 19, wherein the coalescence pores are about 1,000 microns.

21. A gasification system according to claim 14, wherein the coalescence pores are about 1,000 microns.

* * * * *